United States Patent [19]

Takeda

[11] Patent Number: 5,559,772
[45] Date of Patent: Sep. 24, 1996

[54] INFORMATION RECORDING AND/OR REPRODUCING APPARATUS AND METHOD FOR ADJUSTING AN OFFSET AMOUNT OF A FOCUSING SERVO CIRCUIT

[75] Inventor: Junichi Takeda, Inagi, Japan

[73] Assignee: Canon Kabushiki Kaisha, Tokyo, Japan

[21] Appl. No.: 195,197

[22] Filed: Feb. 14, 1994

[30] Foreign Application Priority Data

Feb. 17, 1993 [JP] Japan .................................. 5-049938

[51] Int. Cl.⁶ .................................. G11B 7/00
[52] U.S. Cl. .................. 369/44.360; 369/44.35; 369/44.29; 369/44.25
[58] Field of Search .................. 369/34.36, 44.35, 369/44.29, 44.25, 54; 250/201.1, 201.2, 201.3, 201.4, 201.5

[56] References Cited

U.S. PATENT DOCUMENTS

| | | | |
|---|---|---|---|
| 4,340,950 | 7/1982 | Kosaka | 369/44.36 X |
| 4,730,294 | 3/1988 | Funada | 369/44.35 X |
| 4,899,327 | 2/1990 | Bates et al. | 369/44.35 |
| 5,164,932 | 11/1992 | Fennema et al. | 369/44.29 |

FOREIGN PATENT DOCUMENTS

| | | | |
|---|---|---|---|
| 0325491 | 7/1989 | European Pat. Off. | 369/44.36 |
| 0120693 | 5/1993 | Japan | 369/44.36 |

*Primary Examiner*—Aristotelis Psitos
*Assistant Examiner*—Thang V. Tran
*Attorney, Agent, or Firm*—Fitzpatrick, Cella, Harper & Scinto

[57] ABSTRACT

An information recording and/or reproducing apparatus has an auto gain controller for controlling the amplitude level of a reproduction signal read out from a recording medium to a predetermined level. The auto gain controller has a variable gain amplifier for amplifying the reproduction signal, a converter for converting the output of the variable gain amplifier into a DC voltage, and a comparator for comparing the output from the converter with a predetermined reference value and sending the result of the comparison to the variable gain amplifier. The controller also includes a fixing device for fixing the gain of the variable gain amplifier, and a focusing offset for applying an adjuster offset to a focusing servo loop when the gain is fixed by the fixing device, and introducing the output of the converter thereinto while varying the amount of the applied offset, thereby effecting the adjustment of the focusing offset.

6 Claims, 5 Drawing Sheets

: 1

INFORMATION RECORDING AND/OR REPRODUCING APPARATUS AND METHOD FOR ADJUSTING AN OFFSET AMOUNT OF A FOCUSING SERVO CIRCUIT

BACKGROUND OF THE INVENTION

1. Field of the Invention

This invention relates to an optical information recording-reproducing apparatus for recording or reproducing information on or from an optical information recording medium such as an optical disc, and particularly to an offset adjusting device for automatically adjusting a focusing offset.

2. Related Background Art

FIG. 1 of the accompanying drawings is a block diagram showing an example of the signal reproducing system of an optical disc apparatus. In FIG. 1, the reference numeral 1 designates an auto gain control circuit (hereinafter abbreviated as the AGC circuit) for controlling the amplitude level of a reproduction RF signal to a constant level. The reproduction RF signal is a reproduction signal read out from a recording medium (not shown) such as an optical disc, and its amplitude level fluctuates because of various factors, such as the irregularities of the intensity of a beam of reproducing light, the transmittance of an optical system, the reflectance of the optical disc, etc., or a stain on the optical system and on the optical disc. Such fluctuation of the reproduction RF signal causes a binarization error during binarization, and this becomes the cause of erroneously reproduced data. So, in the AGC circuit 1, the amplitude level of the reproduction RF signal is controlled to be at a constant level and a reproduction RF signal of a constant level is supplied to a binarizing circuit 2, whereby the binarization error is prevented and the reproduction of data is effected accurately.

The AGC circuit 1 is comprised of a variable gain amplifier (hereinafter abbreviated as the VGA) 3, a full wave rectifier 4 and a comparator 5, and to control the reproduction RF signal, the output signal of the VGA 3 is first full-wave-rectified by the full wave rectifier 4 and is converted into a DC voltage. The thus obtained DC voltage is compared with a reference value by the comparator 5, and the gain of the VGA 3 is varied so that the difference between the DC voltage and the reference value may become zero, whereby the output signal level of the VGA 3 is controlled to a constant level. Thus, feedback is applied to the gain of the VGA 3, and even if the amplitude level of the reproduction RF signal fluctuates from various factors, there can be obtained a reproduction RF signal of a constant level. This reproduction RF signal is binarized at a predetermined slice level by the binarizing circuit 2, whereafter it is subjected to signal processing such as synchronization and demodulation process by a signal processing circuit, not shown, and reproduction data is produced.

On the other hand, during the starting of the apparatus or during the interchange of the optical disc, the adjustment of a focus offset is effected by the use of the reproduction RF signal. During the adjustment of this offset, a microcomputer 8 sets predetermined offset in a D/A converter 9, and applies the offset to the servo loop of a focusing servo circuit 10. At this time, the reproduction RF signal is full-wave-rectified by a full wave rectifier 6, and thereafter is digitalized by an A/D converter 7 and is introduced into the microcomputer 8. The microcomputer 8 stepwisely changes the offset and measures the amplitude level of the reproduction RF signal each time, and detects the offset when the amplitude level becomes a maximum. That is, the microcomputer searches for the offset during the best focusing when the amplitude of the reproduction RF signal becomes a maximum, and sets it in the D/A converter 9, whereby offset adjustment is effected.

That is, in focus control for forming a minute focus on the optical disc, if the focus deviates (offset occurs), the light spot will become large and a minute signal on the disc will become unreproducible. Also, the focus position differs delicately depending on the thickness of the substrate of the disc and the material of which the substrate of the disc is composed. In addition, the focus can deviate from the ideal focus due to a variation in the optical system with time and therefore, the offset adjustment of the focusing servo circuit is affected so that the best focus may be provided when the optical disc is interchanged or the apparatus is started, as previously mentioned.

Now, in the prior art, as shown in FIG. 1, the full wave rectifier 4 is provided in the AGC circuit 1 and the full wave rectifier 6 is also provided for the adjustment of the focusing offset and therefore, it would occur to one to make these rectifiers common and simplify the circuit construction. However, when the output signal of the full wave rectifier 4 is used for the adjustment of the offset of the focusing servo circuit, the reproduction RF signal of the output of the VGA 3 assumes a constant level due to the control by the AGC circuit 1, and no change will appear in the output of the full wave rectifier 4. That is, if in order to search for the best focus position, a focusing offset is gradually added to the focus position to thereby shift the focus from the defocus state to the best focus state, the reproduction RF signal ought to gradually increase, but since the control of the AGC circuit 1 is performed, no change appears in the output of the full wave rectifier 4. Therefore, it has been difficult to use a single full wave rectifier and two full wave rectifiers have been necessary for the adjustment of focusing servo circuit and for the control of the level of the reproduction RF signal, respectively.

Also, when the output of the full wave rectifier 6 is introduced to the A/D converter 7 to thereby adjust the focusing offset, the reproduction RF signal fluctuates because of various factors before AGC is applied to it and therefore, when the amplitude level of the reproduction RF signal is small, the variation in the input signal to the A/D converter 7 will not appear as a variation in the number of the bits thereof. This has led to a problem that in such a case, the amplitude of the reproduction RF signal cannot be accurately measured and the accuracy of the adjustment of the offset of focusing servo becomes poor.

SUMMARY OF THE INVENTION

The present invention has been developed in order to eliminate such problems and has as its object the provision of an optical information recording-reproducing apparatus in which the circuit construction is simplified and focus offset can be accurately adjusted.

The above object of the present invention is achieved by an optical information recording-reproducing apparatus having means for amplifying a reproduction signal read out from an optical information recording medium, and means for converting the output of the amplifying means into a DC voltage, the gain of the amplifying means being varied on the basis of the output of the converting means and a predetermined reference value to thereby control the amplitude level of the reproduction signal to a predetermined level. An offset is applied to a focusing servo loop to thereby adjust the offset of the focusing servo loop. When the focusing offset is to be adjusted, the gain of the amplifying means is held and in this held state, an offset is applied to the focusing servo loop, and the output of the converting means is introduced while the amount of this offset is changed, whereby the adjustment of the focusing offset is effected.

Also, the above object of the present invention is achieved by an optical information recording-reproducing apparatus having means for amplifying a reproduction signal read out from an optical information recording medium, and means for converting the output of the amplifying means into a DC voltage, the gain of the amplifying means being varied on the basis of the output of the converting means and a predetermined reference value to thereby control the amplitude level of the reproduction signal to a predetermined level. An offset is applied to a focusing servo loop to thereby adjust the offset of the focusing servo loop. Also provided is comparing means for comparing the output of the converting means with a reference value set to a level somewhat lower than the output of the converting means during the control of the amplitude level of the reproduction signal. When the focusing offset is to be adjusted, the holding of the gain of the amplifying means and the application of the offset to the focusing servo loop in the held state are repeated while the offset is changed in a direction toward the best focus direction, and the output of the comparing means is monitored to thereby detect the amount of offset immediately before the output of the comparing means varies as the amount of offset of the best focus point.

DETAILED DESCRIPTION OF THE PREFERRED EMBODIMENTS

Figure 1:
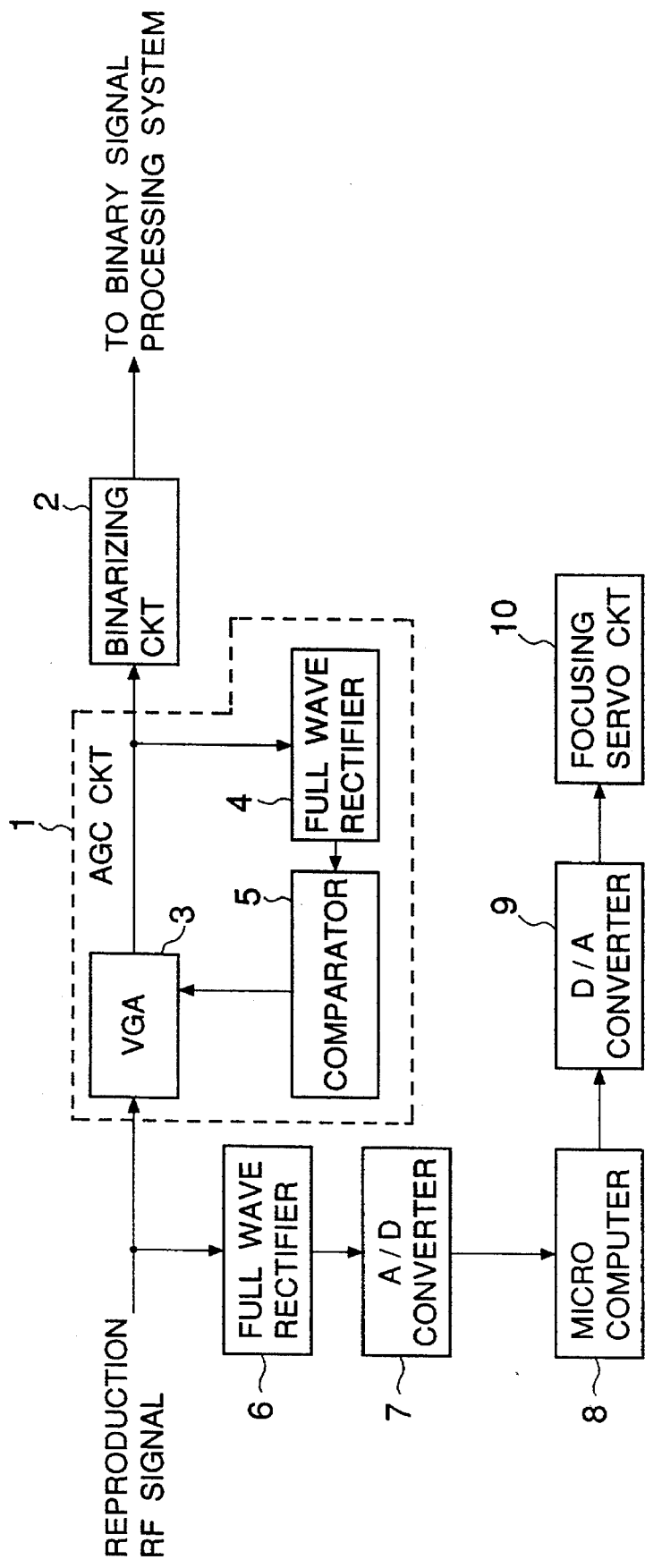
FIG. 1 is a block diagram showing the signal reproducing system of an optical disc apparatus according to the prior art.
Figure 2:
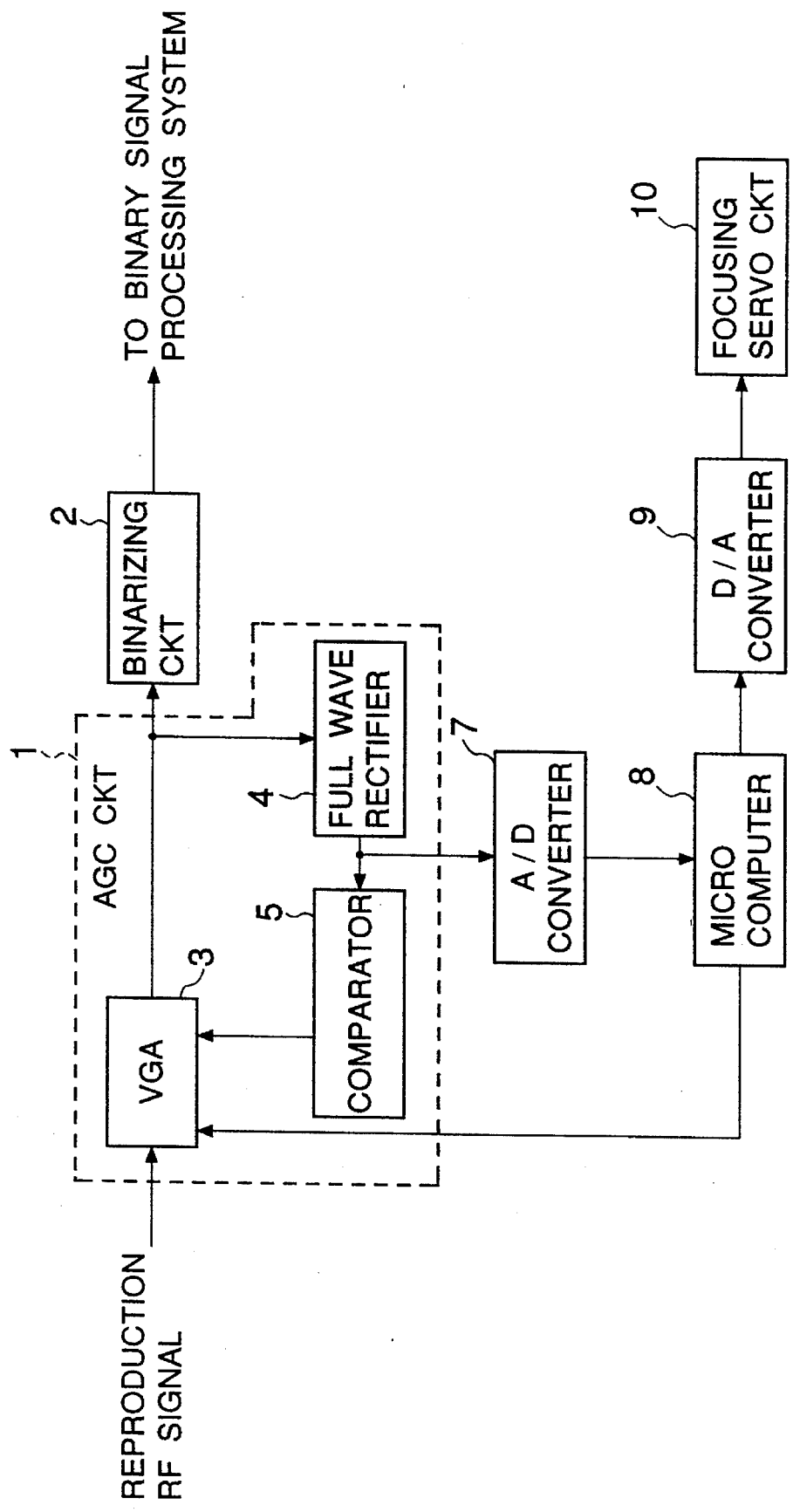
FIG. 2 is a block diagram showing an embodiment of the optical information recording-reproducing apparatus of the present invention.

Some embodiments of the present invention will hereinafter be described in detail with reference to the drawings. FIG. 2 is a block diagram showing an embodiment of the optical information recording-reproducing apparatus of the present invention. In FIG. 2, portions functionally identical to those of the prior-art apparatus shown in FIG. 1 are given identical reference numerals and need not be described in detail. Also, a description will be provided herein with an optical disc apparatus as an example. In FIG. 2, an AGC circuit 1 is a control circuit for controlling the amplitude level of an inputted reproduction RF signal to a constant level. The reproduction RF signal is a signal read out from an optical disc which is an information recording medium, and is supplied to a binarizing circuit 2 as a reproduction signal stabilized to a predetermined level by the AGC circuit 1.

In the present embodiment, the design is made such that the output signal of a full wave rectifier 4 in the AGC circuit 1 is outputted not only to a comparator 5 but also to an A/D converter 7 and the offset adjustment of the focusing servo circuit is effected by the utilization of the output signal of the full wave rectifier 4. That is, the full wave rectifier 4 provided for the gain control of a VGA 3 is used also for the offset adjustment of the focusing servo circuit.

The operation of the present embodiment will now be described specifically. First, when the apparatus is started or when the information recording medium (here, the optical disc) is interchanged, the optical disc is rotated by the driving of a motor, not shown, and a semiconductor laser (not shown) which is a light source for recording and reproduction is turned on. The focusing servo circuit and tracking servo circuit are then turned on in succession, and the offset adjustment of the focusing servo circuit is started. In the state in which each servo is turned on, the AGC circuit 1 is operating and the amplitude level of the reproduction RF signal is controlled to a constant level. Accordingly, the output level of the full wave rectifier 4 also is constant.

During the offset adjustment of the focusing servo circuit, a microcomputer 8 first issues a command to the VGA 3 so as to stop the gain controlling operation and to hold the gain in that state. The microcomputer 8 then applies an offset to a focusing servo circuit 10 through a D/A (digital-to-analog) converter 9. This offset is applied so as to become stepwisely greater, and by the application of this offset, the size of a light spot on the optical disc is varied and therefore, the amplitude level of the reproduction RF signal varies in conformity with the magnitude of the offset. Since the VGA 3 now is set at a fixed gain, the variation in the amplitude level of the reproduction RF signal appears as a variation in the output level of the full wave rectifier 4. The output level of the full wave rectifier 4 is introduced into the microcomputer 8 by an A/D converter 7, and the variation in the amplitude level of the reproduction RF signal is detected. Thus, the microcomputer 8 sequentially changes the amount of offset and detects the amount of offset for which the amplitude level of the reproduction RF signal becomes a maximum. The thus obtained amount of offset is finally set in the D/A converter 9 and is applied to the focusing servo loop, whereby the offset adjustment of the focusing servo for holding the focus in the best focus state is effected. When this is completed, the microcomputer 8 releases the command for fixing the gain so far issued therefrom to the VGA 3, and in the AGC circuit 1, the gain controlling operation is again started. Subsequently, the offset adjustment of a tracking servo circuit, not shown, is effected, and the apparatus becomes capable of recording or reproducing.

As described above, in the present embodiment, when the offset of the focusing servo is to be adjusted, the gain of the VGA 3 is fixed and in this fixed state, the offset is adjusted, whereby the output of the full wave rectifier 4 provided in the AGC circuit 1 can be used also for offset adjustment. That is, the gain of the VGA 3 is fixed during the adjustment of the offset, whereby the amplitude level of the reproduction RF signal becomes varied by the application of the offset and therefore, the adjustment of the offset becomes possible by the output of the full wave rectifier 4 and thus, the full wave rectifier heretofore provided for offset adjustment can be eliminated, and the circuit construction of the apparatus can be correspondingly simplified. Also, the gain of the VGA 3 is fixed during the offset adjustment and thus, the output voltage of the full wave rectifier 4 has a certain degree of magnitude. So, if the gain of the VGA 3 is predetermined so that the output voltage of the full wave rectifier 4 may fall within the input range of the A/D converter 7, the input voltage of the A/D converter 7 will not depart from the input range as in the prior art, and the output voltage of the full wave rectifier 4 can be measured with good accuracy and also, the adjustment of the focusing offset can be effected with good accuracy.

Further, when the focusing offset is to be adjusted, it is sometimes the case that the deviation of the focusing offset is great and the amplitude of the reproduction RF signal is much smaller than that during the best focusing. If for example, the amplitude of the reproduction RF signal is about half of that during the best focusing, the gain of the VGA 3 will become twice as great as that during the best focusing. In such a case, the output voltage of the full wave rectifier 4 will become steadily greater when the best focusing point is being searched for and therefore, may exceed the input range of the A/D converter 7. Accordingly, in such case, it is to be understood that when the output voltage of the A/D converter 7 exceeds a predetermined level, the microcomputer 8 releases the gain holding operation of the VGA 3 and again instructs the AGC circuit 1 to perform the gain controlling operation. That is, after the gain of the VGA 3 is reset so that the output voltage of the full wave rectifier 4 may fall within the input range of the A/D converter 7, the gain of the VGA 3 can be fixed and the adjustment of the focusing offset can be resumed.

Figure 3:
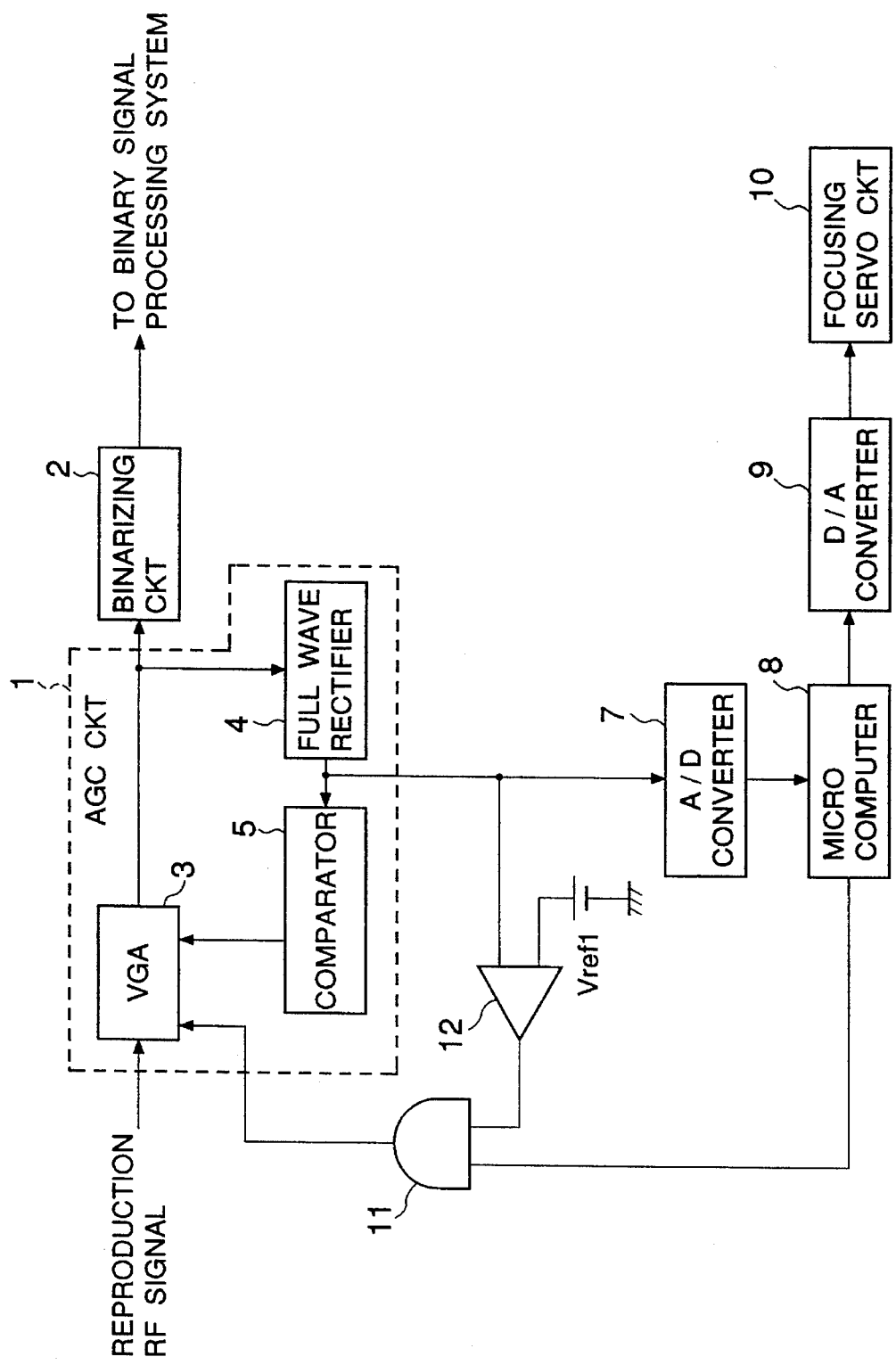
FIG. 3 is a block diagram showing another embodiment of the present invention.

FIG. 3 is a block diagram showing another embodiment of the present invention. In FIG. 3, the reference numeral 11 designates an AND circuit for gating a gain hold command outputted from a microcomputer 8 to a VGA 3, and the reference numeral 12 denotes a comparator for controlling the gating operation of the AND circuit 11. The comparator 12 compares the output voltage of a full wave rectifier 4 with a reference voltage $V_{ref1}$, and outputs a gate control signal to the AND circuit 11 in conformity with the result of the comparison. The microcomputer 8 outputs a high level signal as a gain hold command signal to the VGA 3, which stops the gain controlling operation and fixes the gain to the current gain as soon as it receives the high level signal. Also, in the VGA 3, when it receives a low level signal, the gain holding operation is released and a gain controlling operation conforming to the output of the comparator 5 is started. On the other hand, the reference voltage $V_{ref1}$ set by the comparator 12 is set to a level slightly lower than the upper limit value of the input range of an A/D converter 7, and the comparator 12 outputs a high level signal when the output voltage of the full wave rectifier 4 is lower than the reference voltage. Also, when the output voltage of the full wave rectifier 4 exceeds the reference voltage, the output of the comparator 11 is inverted to a low level.

In this embodiment, when focusing offset is to be adjusted, a gain hold command signal of a high level is first outputted from the microcomputer 8 to the AND circuit 11. If the output voltage of the full wave rectifier 4 is lower than the reference voltage $V_{ref1}$ and falls within the input range of the A/D converter 7, the output voltage of the comparator 12 assumes a high level and therefore, the gain hold command signal of a high level from the microcomputer 8 is outputted to the VGA 3 through the AND circuit 11, and the gain of the VGA 3 is fixed at the then gain. Accordingly, at this time, as in the embodiment of FIG. 2, the adjustment of focusing offset is effected with the gain fixed.

If the focusing offset deviates too much, the output voltage of the full wave rectifier 4 will rise during the adjustment of the offset as previously described, and will exceed the reference voltage $V_{ref1}$. Since the reference voltage $V_{ref1}$ is set to a level slightly lower than the upper limit value of the input range of the A/D converter 7 as previously described, the output of the comparator 12 assumes a low level before the output voltage of the full wave rectifier 4 exceeds the input range, and the output of the AND circuit 12 is also inverted to a low level. As a result, the gain holding operation of the VGA 3 is released and in the AGC circuit 1, the gain controlling operation is resumed. In this case, in the AGC circuit 1, control of the gain is effected so as to render the reproduction RF signal at a constant level and therefore, the output voltage of the full wave rectifier 4 also drops to a constant level and comes to fall within the input range of the A/D converter 7. When the output voltage of the full wave rectifier 4 drops, the output of the comparator 12 again assumes a high level and the output of the AND circuit 11 also assumes a high level and therefore, the gain of the VGA 3 is fixed again and in the microcomputer 8, the adjustment of focusing offset is effected again.

As described above, in the present embodiment, when the output voltage of the full wave rectifier 4 exceeds the set value, the gain holding operation of the VGA 3 is released and the gain controlling operation is resumed, whereby even if during the adjustment of the focusing offset, the deviation of the offset is great and the output voltage of the full wave rectifier 4 rises, gain control is effected so as to automatically lower the output voltage of the full wave rectifier 4 and therefore, the output voltage of the full wave rectifier 4 can be prevented from exceeding the input range of the A/D converter 7. Accordingly, even when the deviation of the focusing offset is great, the adjustment of the focusing offset can be effected while the output voltage of the full wave rectifier 4 is automatically controlled so as not to exceed the input range, whereby it becomes possible to effect the adjustment of the offset accurately and quickly.

Figure 4:
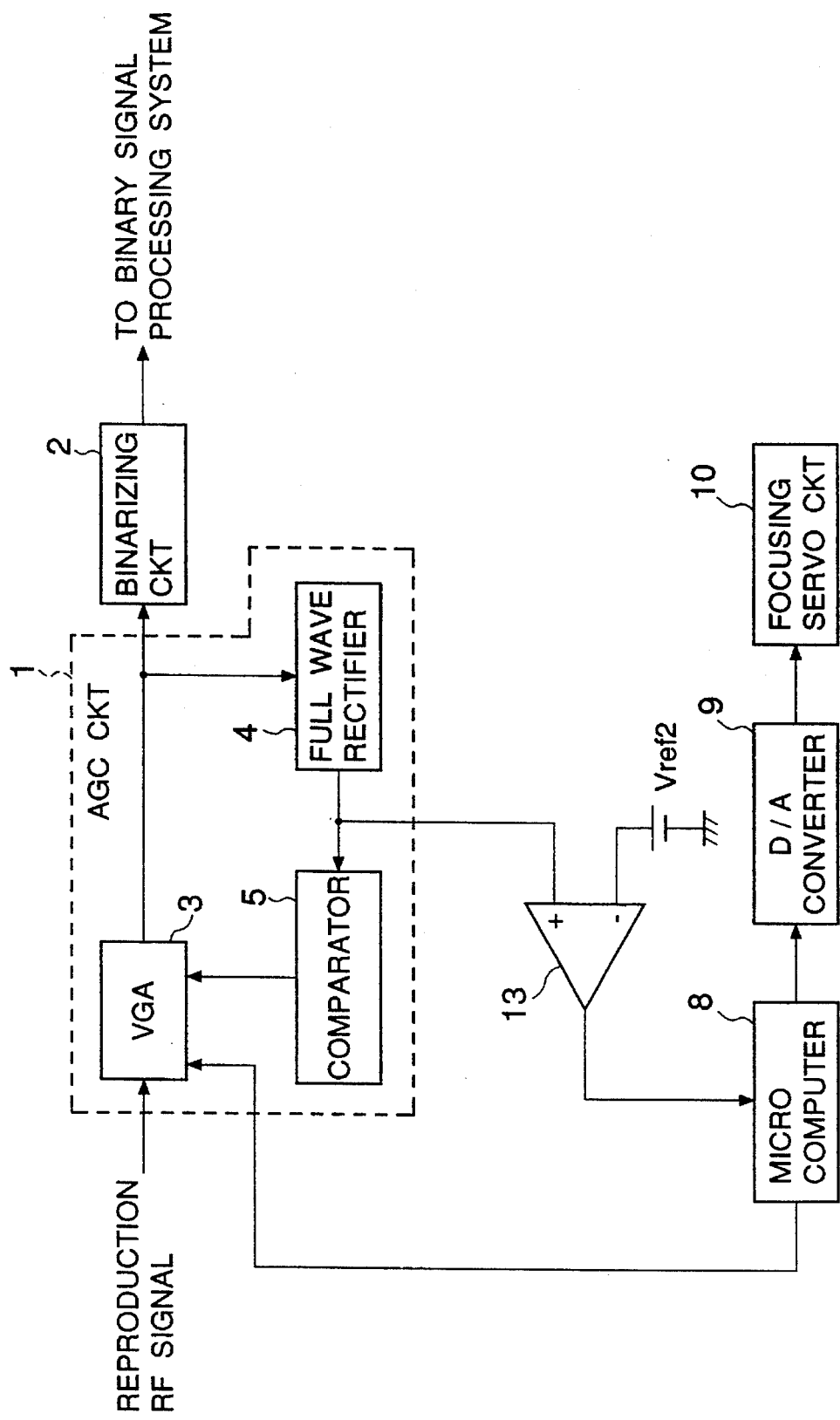
FIG. 4 is a block diagram showing still another embodiment of the present invention.

FIG. 4 is a block diagram showing still another embodiment of the present invention. This embodiment is one in which one of the AND circuit and the A/D converter is eliminated to thereby further simplify the circuit construction. In FIG. 4, the reference numeral 13 designates a comparator for comparing the output of the full wave rectifier 4 with a reference voltage $V_{ref2}$. The output signal of the comparator 13, as will be described later in detail, is outputted to the microcomputer 8 as the detection signal when the best focus position is detected. The reference voltage $V_{ref2}$ is set to a level somewhat lower than the output voltage of the full wave rectifier 4 when the AGC circuit 1 is operating. In the present embodiment, when the focusing offset is to be adjusted, the microcomputer 8 first controls the VGA 3 to once apply gain control thereto, and thereafter fixes the gain. Accordingly, at this time, the output voltage of the full wave rectifier 4 is a constant voltage, while the reference voltage $V_{ref2}$ is set to a level somewhat lower than it and therefore, the output of the comparator 13 assumes a high level. In this state, the microcomputer 8 sets the offset in the D/A converter 9 and applies the offset to the focusing servo circuit 10.

For example, the microcomputer 8 may change 1 bit and apply the offset to the D/A converter 9 in the plus direction. In this case, assuming that the focus has approximated to the best focus, the amplitude of the reproduction RF signal becomes greater correspondingly thereto and the output voltage of the full wave rectifier 4 also becomes higher and therefore, the output of the comparator 13 does not vary, but maintains a high level. That is, when the focus has approximated the best focus, the amplitude of the reproduction RF signal becomes greater and the output voltage of the full wave rectifier 4 also becomes higher and therefore, the output of the comparator 13 does not vary. The microcomputer 8, when it recognizes that the output of the comparator 13 does not vary, releases the gain holding operation of the VGA 3 and again applies gain control thereto and renders the output voltage of the full wave rectifier 4 at a predetermined level, and then fixes the gain of the VGA 3. In this state, the microcomputer 8 now makes the offset greater by one step and monitors the output of the comparator 13. Thus, the microcomputer 8 stepwisely changes the offset and monitors the output of the comparator 13 each time.

As long as the output of the comparator 13 does not vary, the direction in which the offset is applied is the direction in which the focus approximates the best focus. If the output of the comparator 13 varies, it is in the direction in which the focus goes away from the best focus and therefore, at this time, the direction in which the offset is applied is reversed. Thus, the microcomputer 8 changes the offset and approximates the focus to the best focus, and when the output of the comparator 13 varies, the microcomputer judges that the amount of offset immediately before that is the best focus point. The microcomputer 8 then sets the obtained amount of offset of the best focus point in the D/A converter 9 and terminates the adjustment of the focusing offset.

In the present embodiment, the voltage slightly lower than the output voltage of the full wave rectifier 4 when the gain control is working and the output voltage of the full wave rectifier 4 when the offset is applied with the gain fixed are compared with each other by the comparator 13, and the offset is changed and the output of the comparator 13 is monitored, whereby the best focus point can be searched for from the variation in the output of the comparator 13. Accordingly, the adjustment of the focusing offset can be effectively done by the method of monitoring the variation in the output of the comparator 13 and searching for the best focus point, and as a result, the A/D converter for introducing the output voltage of the full wave rectifier 4 thereinto becomes unnecessary and thus, the circuit construction can be further simplified.

The above embodiments have been described with an optical disc apparatus as an example, but the present invention is not restricted thereto, and can also be applied, for example, to the focusing offset adjustment in a magneto-optical disc apparatus and apparatuses of the postscript type, the phase variation type, CD and laser discs.

As described above, according to the present invention, it becomes possible to adjust the focusing offset by the use of the converting means for controlling the amplitude level of the reproduction signal, whereby it becomes unnecessary to newly provide the converting means exclusively for the adjustment of the focusing offset and therefore, making the circuits common can be effectively accomplished and correspondingly, the circuit construction can be simplified. Further, it never happens that as in the prior art, the input signal deviates from the input range of the A/D converter, and any variation in the reproduction signal caused by the application of the offset can be measured accurately, whereby the adjustment of the focusing offset can be effected with good accuracy. Furthermore, any variation in the comparing means is monitored to search for the best focus point, whereby the A/D converter for introducing the amplitude of the reproduction signal thereinto can be made unnecessary and the circuit construction can be further simplified.

Figure 5:
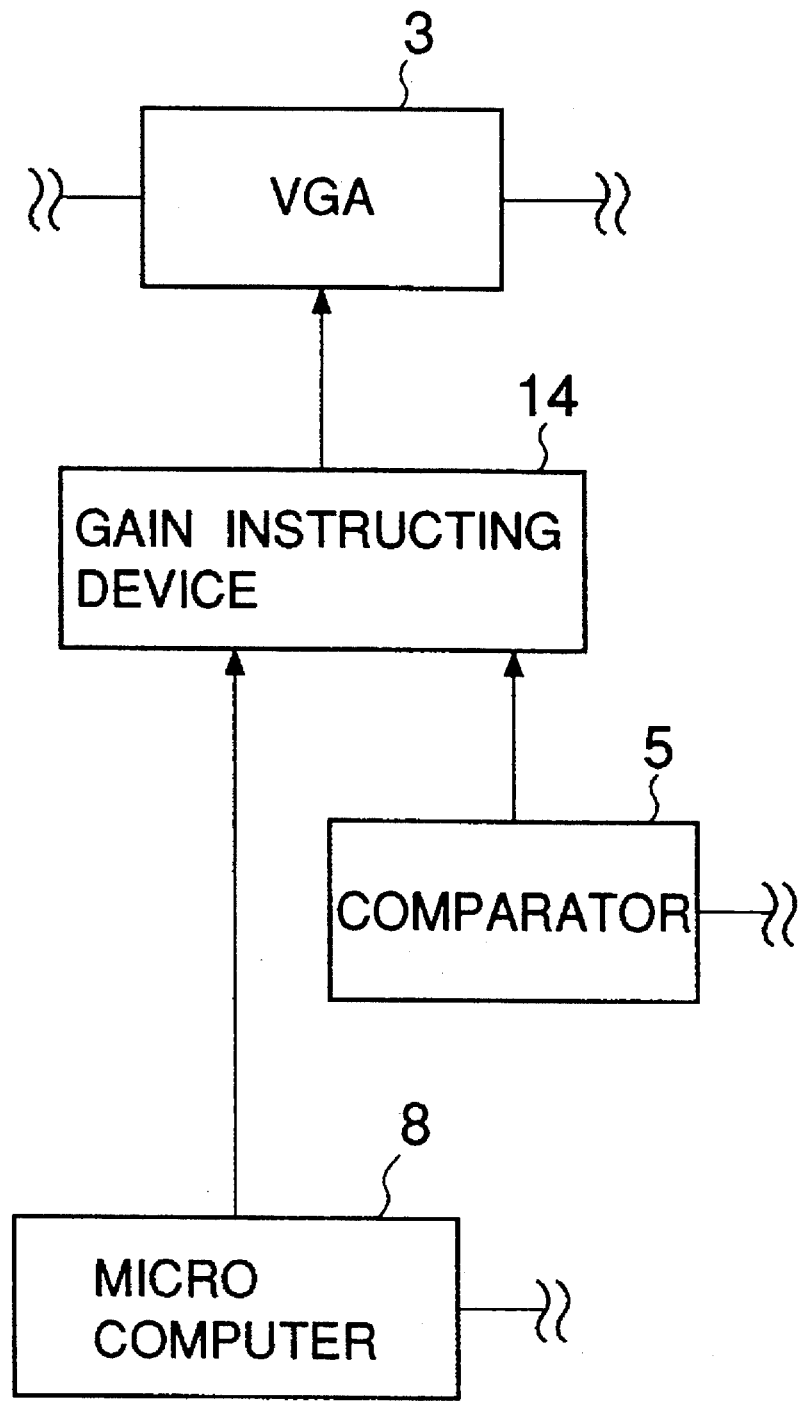
FIG. 5 is a block diagram showing yet still another embodiment of the present invention.

While in each of above-described embodiments, the VGA 3 has been described as including the function of holding the gain, a gain instructing device 14 may be provided discretely from the VGA 3, as shown, for example, in FIG. 5. In FIG. 5, the gain instructing device 14 serves to receive the signals from the comparator 5 and the microcomputer 8 and fix or adjust the gain of the VGA 3.

What is claimed is:

1. An information recording and/or reproducing apparatus comprising:

auto gain control means for controlling the amplitude level of a reproduction signal read out from a recording medium to be at a predetermined level, said auto gain control means having variable gain amplifying means for amplifying the reproduction signal, converting means for converting the output of said variable gain amplifying means into a DC voltage, and comparing means for comparing the output from said converting means with a predetermined reference value and sending the result of the comparison to said variable gain amplifying means;

fixing means for fixing the gain of said variable gain amplifying means;

a. focusing servo circuit for performing focusing control of a light spot with respect to the recording medium; and focusing offset adjusting means having an analog-to-digital converter, a microcomputer and a digital-to-analog converter, wherein when a fixation instruction is issued from the microcomputer and the gain is fixed by said fixing means in response thereto, the output from said converting means is inputted into said microcomputer via said analog-to-digital converter while said microcomputer applies a focusing offset to said focusing servo circuit via said digital-to-analog converter, and said microcomputer adjusts the focusing offset so that the output of said converting means is maximized.

2. The information recording and/or reproducing apparatus of claim 1, wherein said microcomputer sets the gain of said variable gain amplifying means during the adjustment of said focusing offset such that the output of said converting means falls within an input range of said analog-to-digital converter.

3. The information recording and/or reproducing apparatus of claim 1, further comprising second comparing means for comparing the output of said converting means with a reference value set to a value lower than the upper limit value of an input range of said analog-to-digital converter, and wherein the output of said converting means exceeds the reference value, said microcomputer releasing the gain fixing operation of said variable gain amplifying means in response to the output of said second comparing means.

4. An information recording and/or reproducing apparatus having:

auto gain control means for controlling the amplitude level of a reproduction signal read out from a recording medium to be at a predetermined level, said auto gain control means having variable gain amplifying means for amplifying the reproduction signal, converting means for converting the output of said variable gain converting means into a DC voltage, and comparing means for comparing the output from said converting means with a predetermined reference value, and sending the result of the comparison to said variable gain amplifying means;

second comparing means for comparing the output of said converting means with a second reference value set to a value lower than the output of said converting means when the reproduction signal is controlled to the predetermined level; and focusing offset adjusting means, receiving an output from said second comparing means, for fixing the gain of said variable gain amplifying means, said focus offset adjusting means comprising means for repeating the application of an offset to a focusing servo loop while said repeating means changes the amount of the offset in a direction toward the best focus, said focus offset adjusting means also comprising means for determining that the amount of offset immediately before the output of said second comparing means varies is the amount of offset corresponding to the best focus.

5. An information recording and/or reproducing apparatus having:

auto gain control means for controlling the amplitude level of a reproduction signal read out from a recording medium to be at a predetermined level, said auto gain control means having amplifying means for amplifying the reproduction signal, converting means for converting the output of said amplifying means into a DC voltage, and comparing means for comparing the output from said converting means with a predetermined reference value, and controlling the gain of said amplifying means in conformity with the result of the comparison; and focusing offset adjusting means for applying an offset to a focusing servo loop, and said focusing offset adjusting means introducing the output of said converting means into the focusing servo loop while said focus offset adjusting means varies the amount of said applied offset, to thereby effect the adjustment of the focusing offset, said focusing offset adjusting means being connected to said amplifying means and said converting means and fixing the gain of said amplifying means when introducing the output from said converting means into said amplifying means.

6. A method of adjusting an offset amount of a focusing servo circuit in an optical information recording and/or reproducing apparatus, said method comprising the steps of:

fixing the gain of an amplifier for amplifying a reproduction signal read out from an optical information recording medium;

detecting an offset amount of the focusing servo circuit at which the amplitude of the reproduction signal is maximized while varying the offset amount applied to the focusing servo circuit in a state in which the gain of the amplifier is fixed in said fixing step; and releasing the fixing of the gain of the amplifier after said step of detecting the offset amount.

* * * * *

UNITED STATES PATENT AND TRADEMARK OFFICE
CERTIFICATE OF CORRECTION

PATENT NO. : 5,559,772
DATED : September 24, 1996
INVENTOR(S) : JUNICHI TAKEDA

It is certified that error appears in the above-indentified patent and that said Letters Patent is hereby corrected as shown below:

ON THE COVER PAGE
   [57] ABSTRACT
      Line 12, "offset for applying an adjuster" should read --offset adjuster for applying an--.

COLUMN 1
      Line 23, "Fluctuates" should read --fluctuates--.
      Line 49, "Fluctuates" should read --fluctuates--.

COLUMN 2
      Line 41, "Fluctuates" should read --fluctuates--.

UNITED STATES PATENT AND TRADEMARK OFFICE
CERTIFICATE OF CORRECTION

PATENT NO. : 5,559,772

DATED : September 24, 1996

INVENTOR(S) : JUNICHI TAKEDA

It is certified that error appears in the above-indentified patent and that said Letters Patent is hereby corrected as shown below:

COLUMN 8
    Line 17, "a. focusing" should read --a focusing--.

Signed and Sealed this

Fourth Day of February, 1997

Attest:

BRUCE LEHMAN

*Attesting Officer*      *Commissioner of Patents and Trademarks*